June 14, 1960
W. D. TEAGUE, JR
2,940,332
RATIO CHANGER DEVICE
Filed April 27, 1955
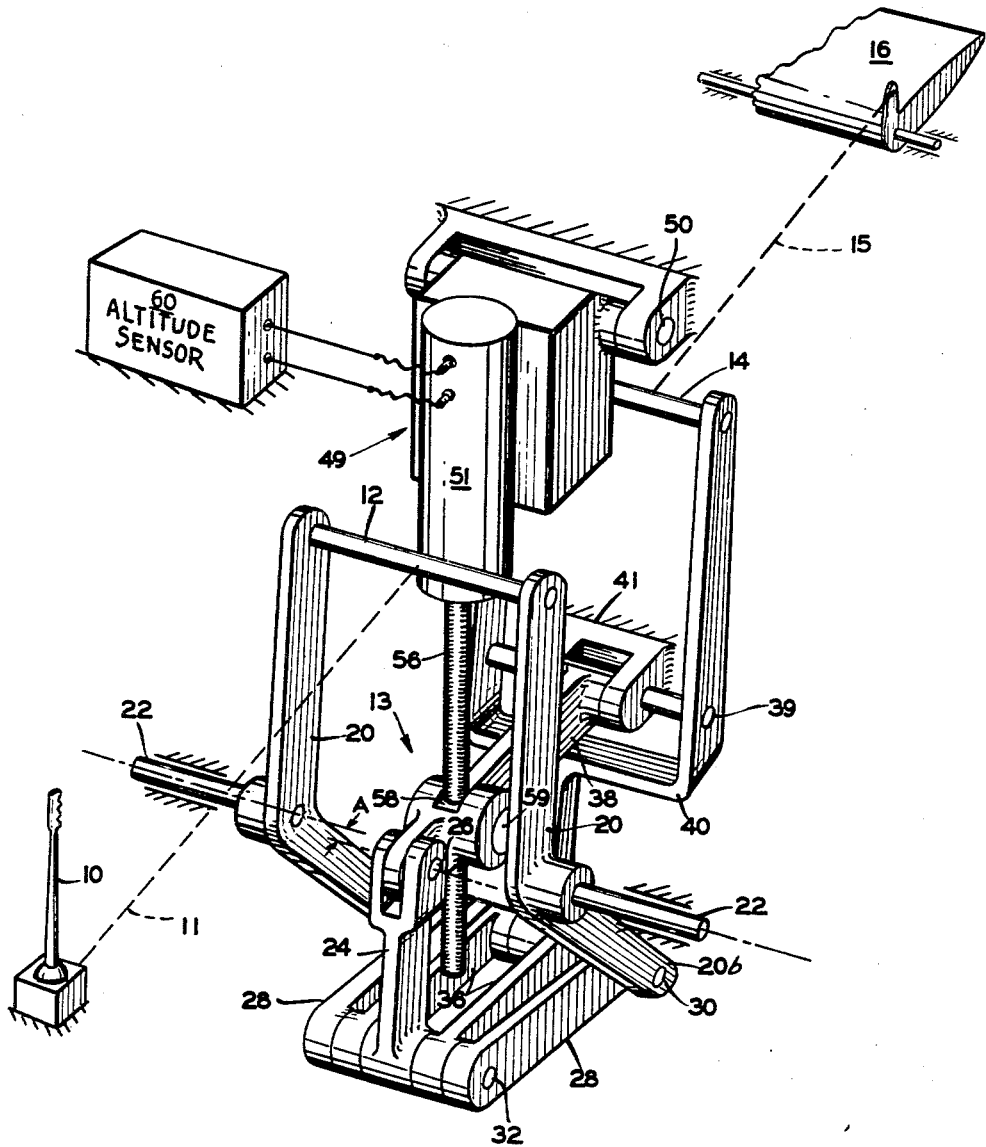
INVENTOR.
WALTER D. TEAGUE JR.
BY
Oscar B Brumback
ATTORNEY

United States Patent Office 2,940,332
Patented June 14, 1960

2,940,332

RATIO CHANGER DEVICE

Walter D. Teague, Jr., Alpine, N.J., assignor to Bendix Aviation Corporation, Teterboro, N.J., a corporation of Delaware Filed Apr. 27, 1955, Ser. No. 504,270

6 Claims. (Cl. 74—522)

This invention relates generally to steering systems for aircraft and, more particularly, to aircraft steering systems wherein the ratio of movement of the controller to the movement of the control surface may be varied.

An aircraft is generally maneuvered by the displacement of a control surface. However, the extent of the surface displacement necessary to execute a given maneuver is dependent upon the flying condition of the craft. For example, if the craft is flying at low altitude or high speed less surface deflection may be necessary to obtain a given control action than would be required if the craft were flying at high altitude or low speed.

The present invention contemplates the provision of a ratio changer between the control surface of a craft and the manual controller so that the ratio of movement may be changed as a function of changing flight conditions. Thus, a given movement of the conventional manual control column of an aircraft will exert the same aerodynamic effect on the craft despite varying flight conditions of the craft. While the total travel of the controller remains the same, the travel of the control surface may be reduced from a maximum value to a minimum value. Thus, although the manual controller may be moved to a "hard over" position, the ratio changer limits the maximum surface deflection attainable and, thereby, limits the maximum aerodynamic load which will be imposed on the surface for widely varying flight conditions.

An object of the present invention, therefore, is to provide a novel aircraft steering system having means for changing the ratio of manual controller movement to surface movement.

Another object is to provide a novel ratio changer whose ratios of output to input may be changed in continuous, stepless fashion and whose curve of ratios has a highly linear characteristic.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

The single sheet of drawing illustrates schematically a system for changing the ratio of the movement of a controller to the resultant movement of a control surface of a craft.

Turning now to the drawing, the manual controller 10 is connected by a suitable mechanical connection 11 to input bar 12 of the novel ratio changer 13 of the present invention whose output bar 14 is connected by a suitable mechanical linkage 15 to a control surface 16 of the craft. Thus, movement of the stick 10 is transmitted through ratio changer 13 to surface 16.

The novel ratio changer 13 comprises a pair of members 20 rotatable about fixed shafts 22, a member 24 rotatable about a pivot pin 26, a pair of members 28 rotatably connected to members 20 by pins 30 and connected to member 24 by a pin 32 which also connects a pair of members 36 to these members 24 and 28, and a member 38 connected by pivot pin 39 to another member 40 which is also pivotally connected to member 36. Pivot pin 39 is supported in a fixed block 41. Thus, a parallelogram mechanism is formed with members 36 and 38 constituting one pair of sides and members 24 and 40 constituting the other pair of sides. The laterally symmetrical arrangement illustrated equalizes the bending forces on the mechanism.

The input to the parallelogram is supplied to pin 32 by member 20 and link 28, and the output is provided by member 40. However, the extent of rotation of member 24 about shaft 26 and, therefore, of member 40 about shaft 39 in response to a given rotation of member 20 about shaft 22 depends upon the position of the axis of pin 32 relative to shaft 22 and, accordingly, upon the distance A between shafts 22 and 26. This distance is determined by a power mechanism 49 comprised of a block rotatably on a shaft 50 and mounting a motor 51 for turning a shaft 56 in the nut 58 journaled on a shaft 59 in member 38.

Motor 51 may be actuated in response to a parameter of flight as, for example, by an altitude control 60 which develops a signal for actuating the motor to move member 38 in accordance with atmospheric pressure conditions prevailing during the flight of the aircraft. This changes the position of the shaft 26 and the axis of pin 32 relative to shaft 22 and, thereby, distance A. A suitable altitude device with a motor, such as motor 51, operable in response to change in altitude for maintaining the output signal value of the device at zero is illustrated in U.S. Patent No. 2,657,350 issued to Rossire on October 27, 1953.

For ease in explanation of the operation of ratio changer 13, it will be assumed that member 28 and portion 20b of member 20 are of the same length. Thus, if member 38 be positioned so that distance A is such that the axis of pivot pin 32 and the axis of shaft 22 coincide, the ratio of input to output movement will be infinite; that is, no movement of bar 14 will take place despite a finite value of movement of input bar 12. Then, as the axis of shaft 32 is further displaced from the axis of shaft 22, the ratio of input to output movement becomes smaller.

The lateral movement of manual controller 10 displaces bar 12 angularly about shaft 22. Through link 28, this displaces bar 24 about pivot 26. The bar 36 connecting member 40 and 24 rotates member 40 about shaft 39 an amount equal to the rotation of member 24 about pivot pin 26, and the bar 14 across member 40 displaces the surface 16. Member 38 being fixed at pins 39 and 59 completes the parallelogram.

The operation of motor 51 in response to a change in flight parameter such as altitude sensed by sensor 60 rotates member 38 about shaft 39, thus changing the position of the axes of shafts 26 and 22. This changes distance A and changes the ratio of input movement of controller 10 to the output movement of surface 16. Thus, the ratio of the input displacement to the output displacement varies as member 38 is positioned in response to the output of the altitude control. In this manner the pilot, by displacing the manual controller a given amount, exerts a corresponding given aerodynamic effect on the aircraft despite the widely changing conditions due to wide variations in altitude at which the aircraft may be flown.

The foregoing has presented a novel arrangement for changing the ratio of an angular input with respect to an angular output. In accordance with the present invention, a constant aerodynamic effect may be applied to a craft for a given control action regardless of the flight conditions of the craft.

Although only one embodiment of the invention has been illustrated and described in detail, it is to be expressly understood that invention is not limited thereto. Various changes can be made in the design and arrangement of the parts without departing from the spirit and scope of the invention as will now be understood by those skilled in the art.

What is claimed:

1. A device for changing the ratio between the movement of a controller and a control surface of an aircraft comprising a first member rotatable about a first fixed pivot, means for angularly displacing said first member by said controller, a second member rotatable about a second pivot, a third member connected to said first member by a third pivot and to said second member by a fourth pivot, the third pivot being an equal distance from the first-mentioned pivot and the fourth pivot, the axes of said pivots being arranged in parallel relationship, whereby rotation of said first member rotates said second member, the fourth pivot being adjustably positioned relative to the first pivot and the extent of angular displacement of said second member for a given angular displacement of said first member being a function of the distance of the axis of said fourth pivot from the axis of said first pivot, means responsive to the flight condition of the aircraft for moving said second pivot relative to said first pivot to control said distance, a fourth member rotatable about a fifth pivot, means constraining said fourth member to rotate correspondingly with said second member, and means for moving said surface in response to rotation of said fourth member.

2. A device for changing the ratio between the movement of a control surface of an aircraft and a controller comprising a first member rotatable about a first fixed pivot, a second member rotatable about a second pivot, a third member connected to said first member by a third pivot and to said second member by a fourth pivot, the third pivot being an equal distance from the first-mentioned pivot and the fourth pivot, the axes of said pivots being arranged in parallel relationship, whereby rotation of said first member about the first pivot rotates said second member about said second pivot, the fourth pivot being adjustably positioned relative to the first pivot and the extent of rotation of said second member about said second pivot upon a given extent of rotation of said first member being a function of the distance of said fourth pivot from said first pivot, altitude responsive means for moving said second pivot relative to said first pivot to control the relationship of the axes of rotations of said first and third members about said first and fourth pivots, a fourth member rotatable about a fifth pivot, means connecting said second member and said fourth member and said second pivot and said fifth pivot to form a parallelogram to rotate said fourth member, means for moving said first member in response to movement of said controller, and means for moving said surface in response to rotation of said fourth member.

3. A device for changing the ratio between the movements of a controller and a control surface of an aircraft comprising a shaft, an arm rotatable about said shaft, means for rotating said arm about said shaft upon movement of said controller, a parallelogram having pivots whose axes are parallel to the axis of said shaft, position means fixedly positioning a first side of said parallelogram, means for rotating one side of said parallelogram about a pivot connected with said fixed side including a member pivotally connected to said arm and said one side whereby rotation of said arm rotates said one side about said fixed side, and the side of said parallelogram opposite said one side being connected to said control surface, whereby said surface is moved upon rotation of said last named one side about said fixed side, and aircraft flight condition responsive means operatively connected to said position means to vary the position of said fixed side relative to said shaft for varying the ratio of controller movement to surface movement with changes in the prevailing flight condition of the aircraft.

4. A device for changing the ratio between the movements of a controller and a control surface of an aircraft comprising a first member angularly displaceable about a first pivot in response to movement of said controller, a second member angularly displaceable about a second pivot for moving said surface, and a parallelogram including said second member as a parallelogram side for transmitting the movements of said first member to said second member, a link pivoted to said first member, another pivot connecting said link to the side of said parallelogram opposite said second member for transferring the angular motion of said first member to said parallelogram, motor means for adjustably positioning said last-mentioned pivot relative to said first-mentioned pivot to vary the ratio between the movements of the controller and the control surface of said aircraft, and means responsive to atmospheric pressure conditions prevailing in flight of the aircraft for controlling said motor means so to increase the ratio of controller movement to surface movement with increase in the effective atmospheric pressure.

5. A device for changing the ratio between the movements of a controller and a control surface of an aircraft, comprising a pair of spaced parallel shafts, a first member angularly displaceable about a first of said shafts, means for displacing said first member in response to movement of said controller, a second member angularly displaceable about a second of said shafts, means for moving said surface in response to displacement of said second member, a parallelogram having four sides pivotally connected, said parallelogram including said second shaft as a pivot for connecting said second member as a first side to a second side and having a third side pivoted to said second side, a member connecting said first member and said third side, another member acting as a fourth side of said parallelogram operatively connecting said third side to said first side, a pivot connecting said other member to said third side, motor means for positioning said second side to change the position of said last-mentioned pivot relative to said first shaft, aircraft flight condition responsive means to control said motor means and thereby the position of said last-mentioned pivot whereby the ratio of movement of said controller to movement of said control surface is changed with changes in the prevailing condition of the aircraft.

6. A device for changing the ratio between the movements of a controller and a control surface of an aircraft comprising a first member angularly displaceable about a pivot in response to movement of said controller, a second member angularly displaceable about a pivot for moving said surface, and a parallelogram having pivotally connected sides and including said second member as a side thereof for transmitting the movements of said first member to said second member, a link pivoted to said first member and to the side of said parallelogram opposite said second member for transferring the angular motion of said first member to said parallelogram, means for relatively fixing the side of said parallelogram connecting said second member and said opposite side, and aircraft flight condition responsive means for changing the ratio of said angular displacements by adjusting the position of said last named side.

References Cited in the file of this patent

UNITED STATES PATENTS

| 2,338,379 | Henke | Jan. 4, 1944 |
| 2,437,536 | Johnson et al. | Mar. 9, 1948 |
| 2,486,402 | Hacskaylo | Nov. 1, 1949 |